(12) United States Patent
Gholmieh et al.

(10) Patent No.: US 9,451,489 B2
(45) Date of Patent: Sep. 20, 2016

(54) METHOD AND APPARATUS FOR LTE UPLINK THROUGHPUT ESTIMATION

(71) Applicant: QUALCOMM Incorporated, San Diego, CA (US)

(72) Inventors: Aziz Gholmieh, San Diego, CA (US); Seyed Ali Ahmadzadeh, Santa Clara, CA (US); Amir Aminzadeh Gohari, Poway, CA (US); Arnaud Meylan, San Diego, CA (US); Pavan Kumar Vitthaladevuni, San Diego, CA (US); Jong Hyeon Park, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 14/534,919

(22) Filed: Nov. 6, 2014

(65) Prior Publication Data

US 2015/0124605 A1 May 7, 2015

Related U.S. Application Data

(60) Provisional application No. 61/901,370, filed on Nov. 7, 2013.

(51) Int. Cl.
*H04L 12/26* (2006.01)
*H04W 24/08* (2009.01)
*H04W 28/02* (2009.01)
*H04W 72/12* (2009.01)

(52) U.S. Cl.
CPC ......... *H04W 24/08* (2013.01); *H04W 28/0205* (2013.01); *H04W 72/1252* (2013.01)

(58) Field of Classification Search
CPC .......... H04W 28/0231; H04W 24/08; H04W 28/0205; H04W 72/1252
USPC ......................................... 370/232–234, 253
See application file for complete search history.

(56) References Cited

U.S. PATENT DOCUMENTS

| | | | |
|---|---|---|---|
| 7,369,494 | B2 | 5/2008 | Chen et al. |
| 7,957,286 | B2 | 6/2011 | Yun et al. |
| 8,412,245 | B2 | 4/2013 | Delaval |
| 2005/0111361 | A1 | 5/2005 | Hosein |
| 2007/0097257 | A1 | 5/2007 | El-Maleh et al. |
| 2007/0153916 | A1 | 7/2007 | Demircin et al. |
| 2014/0022933 | A1* | 1/2014 | Yi .................. H04W 24/02 370/253 |
| 2014/0029455 | A1 | 1/2014 | Vitthaladevuni et al. |
| 2014/0106827 | A1 | 4/2014 | Lim et al. |

OTHER PUBLICATIONS

International Search Report and Written Opinion—PCT/US2014/064604—ISA/EPO—Mar. 10, 2015.

* cited by examiner

*Primary Examiner* — Mang Yeung
(74) *Attorney, Agent, or Firm* — Arent Fox LLP

(57) ABSTRACT

A method, an apparatus, and a computer program product for wireless communication are provided. The apparatus determines an observed bit rate based on uplink transmissions of the UE, estimates an available link capacity for the UE, selects an estimate factor, and estimates available uplink throughput for future uplink transmissions of the UE as a function of the observed bit rate, the estimated available link capacity, and the estimate factor.

26 Claims, 15 Drawing Sheets

METHOD AND APPARATUS FOR LTE UPLINK THROUGHPUT ESTIMATION

CROSS-REFERENCE TO RELATED APPLICATION(S)

This application claims the benefit of U.S. Provisional Application Ser. No. 61/901,370, entitled "Method and Apparatus for LTE Uplink Throughput Estimation" and filed on Nov. 7, 2013, which is expressly incorporated by reference herein in its entirety

BACKGROUND

1. Field

The present disclosure relates generally to communication systems, and more particularly, to methods and apparatuses for estimating uplink throughput for LTE.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. A method, an apparatus, and a computer program product for wireless communication are provided. The apparatus determines an observed bit rate based on uplink transmissions of the UE, estimates an available link capacity for the UE, selects an estimate factor, and estimates available uplink throughput for future uplink transmissions of the UE as a function of the observed bit rate, the estimated available link capacity, and the estimate factor.

DETAILED DESCRIPTION

Figure 1:
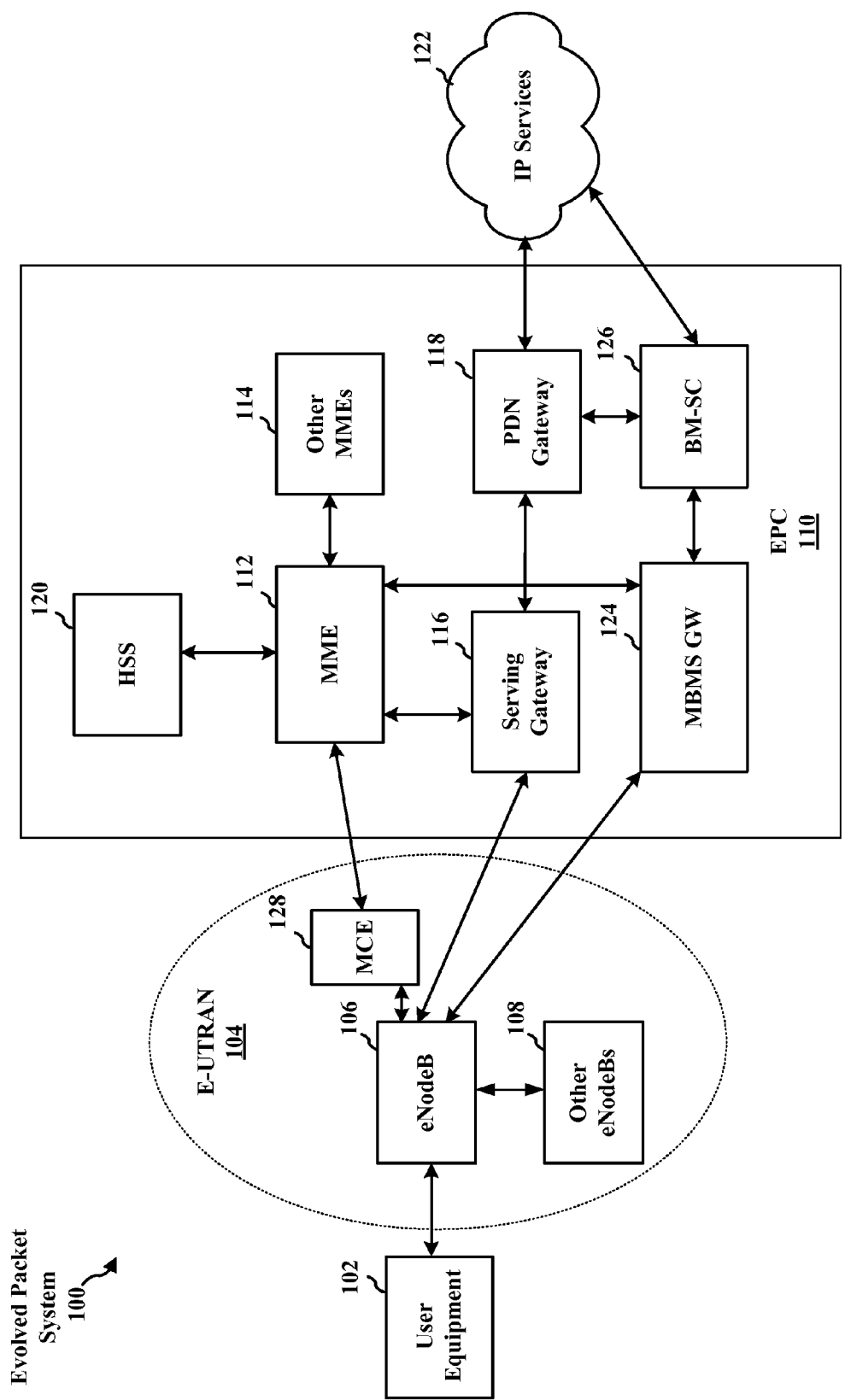
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106, other eNBs 108, and a Multicast Coordination Entity (MCS) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
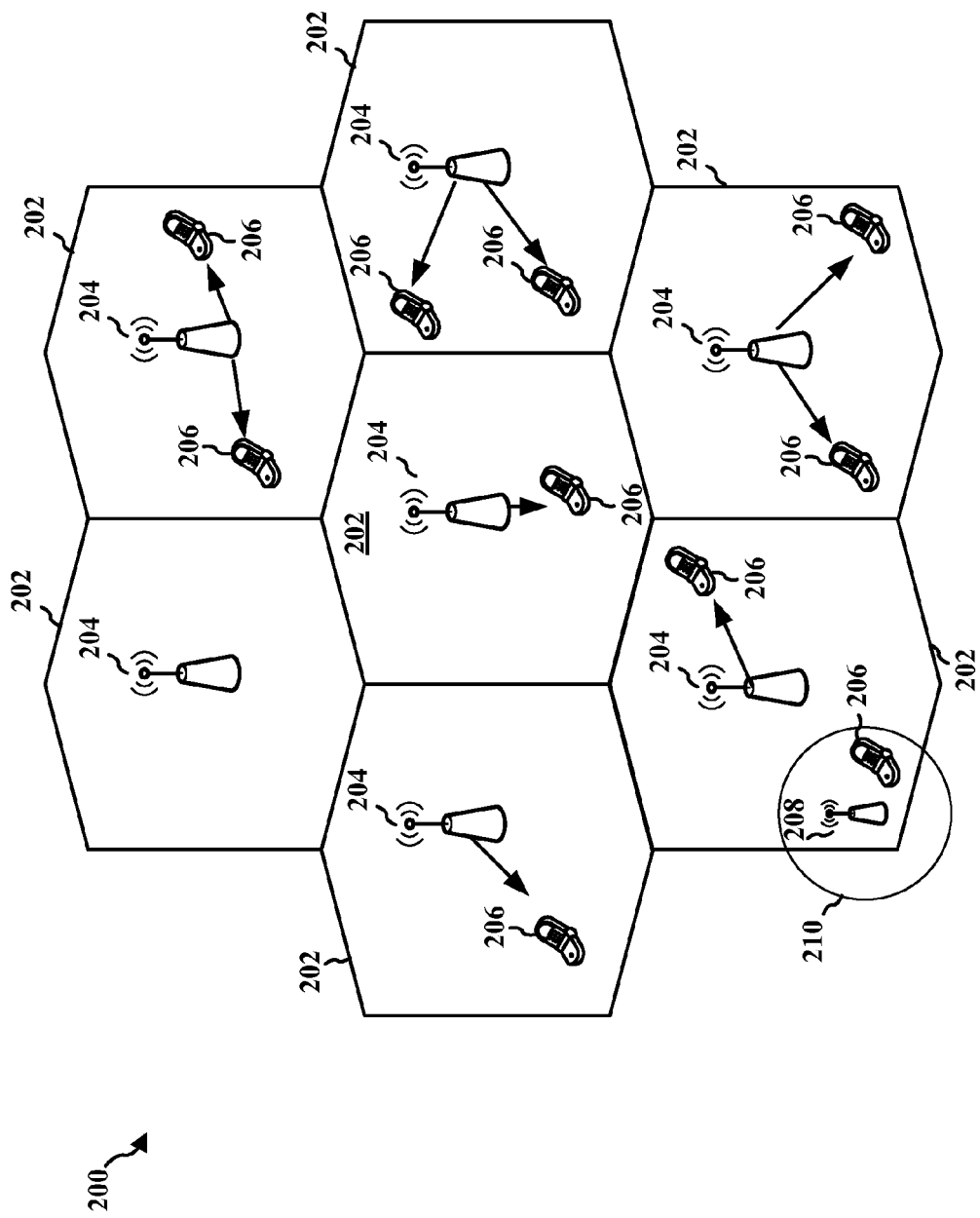
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g, applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
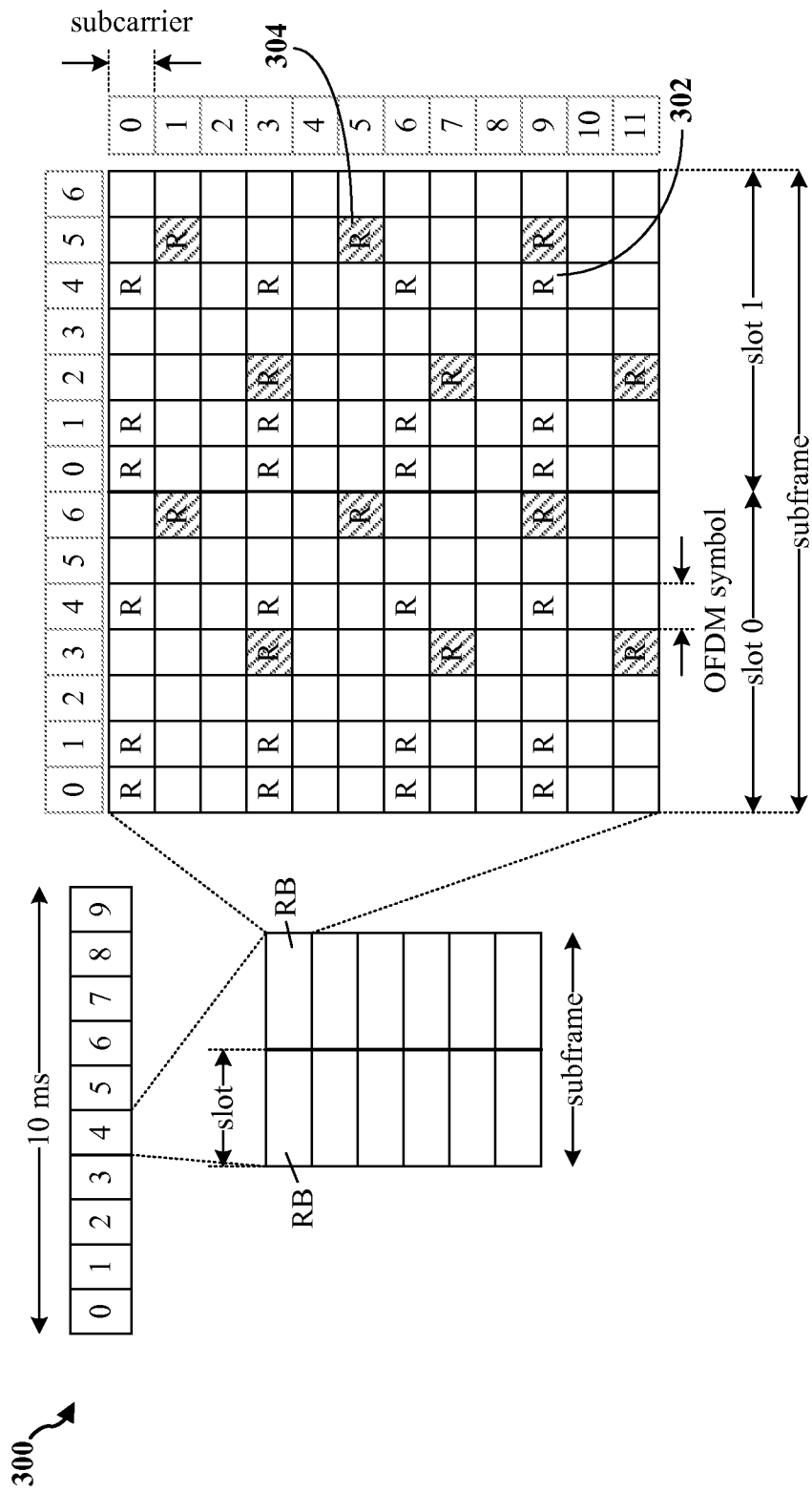
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
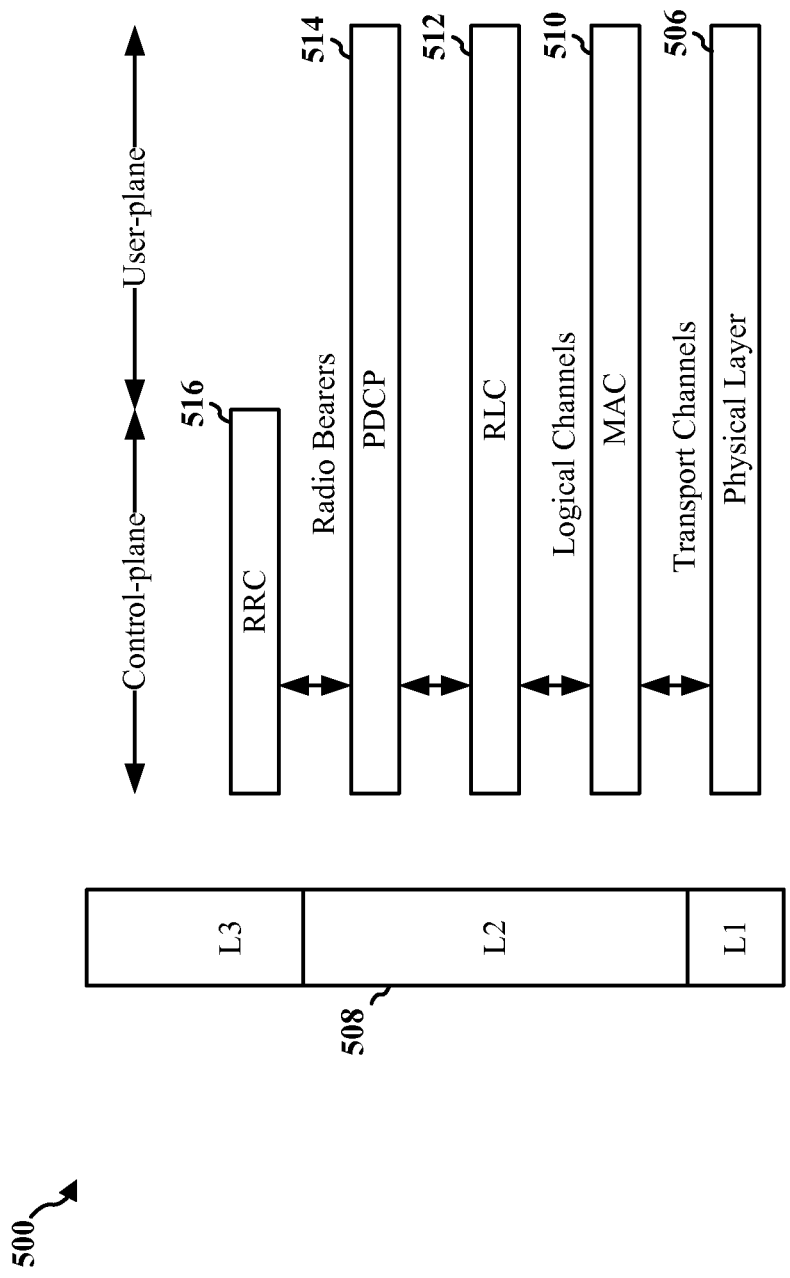
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506.

Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
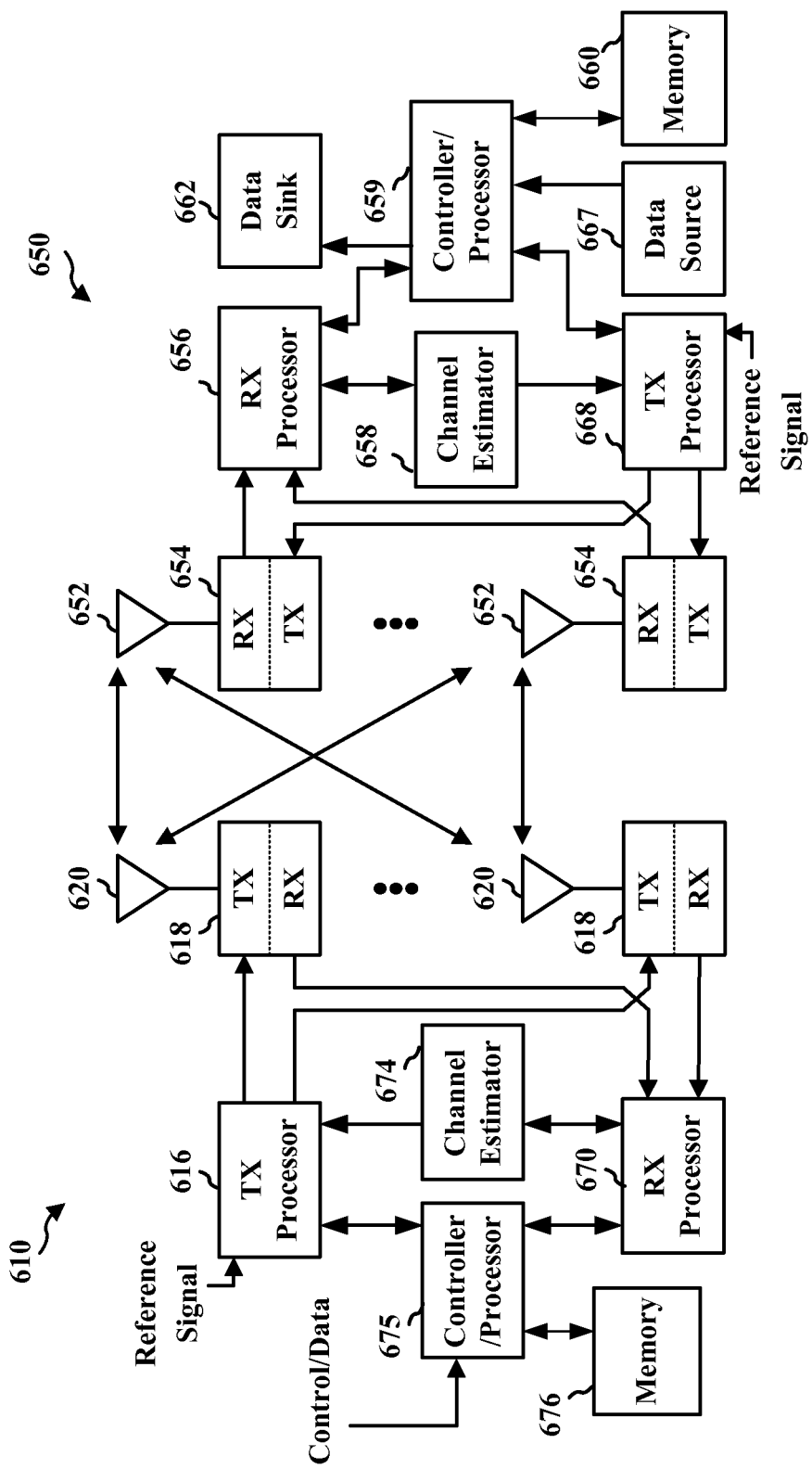
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (e.g, physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
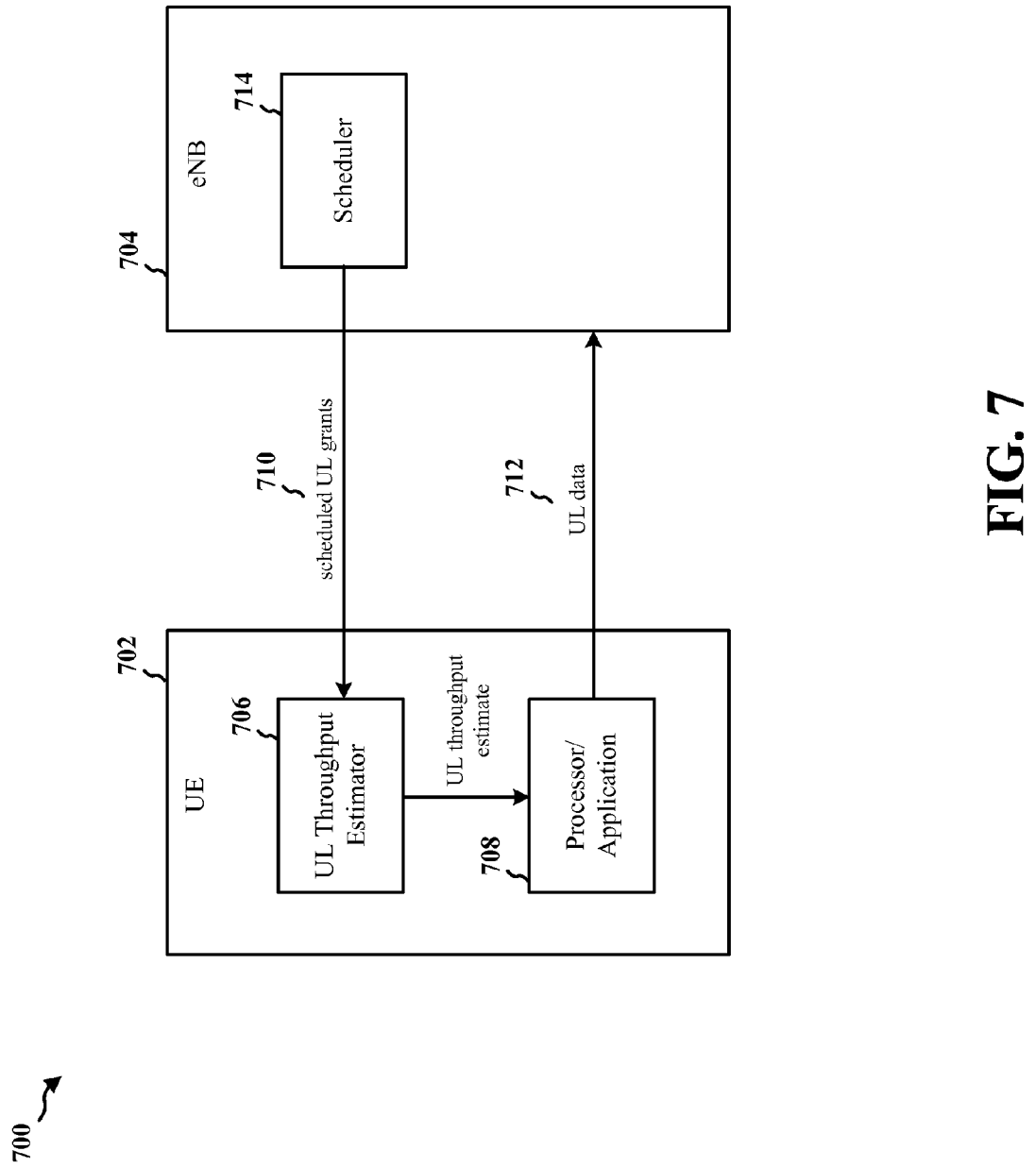
FIG. 7 is an illustration of a wireless communication system including a UE communicating with a serving eNB to receive wireless network access.

FIG. 7 is an illustration 700 of a wireless communication system including a UE 702 communicating with a serving eNB 704 to receive wireless network access. As part of wireless network access, the scheduler 714 of the serving eNB 704 grants the UE 702 uplink resources 710 for uplink transmissions. The quantity of uplink resources 710 granted to a UE 702 for uplink transmissions may vary, for example, as a function of the number of UEs being served by the serving eNB 704. Applications on a UE 702 may adjust operations in accordance with the amount of uplink resources granted to the UE. For example, if an application wants to transmit video data but insufficient resources are granted, the application may delay transmission until enough uplink resources are available. It would be beneficial for a UE 702 to have an indication or estimate of future uplink throughput, so applications may adjust in advance.

In an aspect, a UE 702 includes an uplink throughput estimator 706 that predicts or estimates available uplink throughput for future uplink transmissions. In one aspect, the uplink throughput estimation is a function of an observed bit rate (OBR) derived based on past scheduled uplink transmission grants to the UE, and a long term factor that is based on an estimate of link capacity and a selected estimate factor. The uplink throughput estimator 706 provides an estimate of uplink throughput to a processor/application 708. Based on the uplink throughput estimation, the processor/application 708 may adjust its operation and transmit uplink data 712 to the serving eNB 704.

In one configuration, the uplink throughput estimation is defined as:

Estimated available total rate=Max(*OBR*\*long term factor,*GBR*,Minimum*BR*), (Eq. 1)

where:
OBR=observed bit rate (for a past/previous observation period T);
long term factor=estimate factor (E)\*(link capacity/OBR);
GRB=guaranteed bit rate;
MinimumBR=0 or 2 kbps.

Observed Bit Rate

Figure 8:
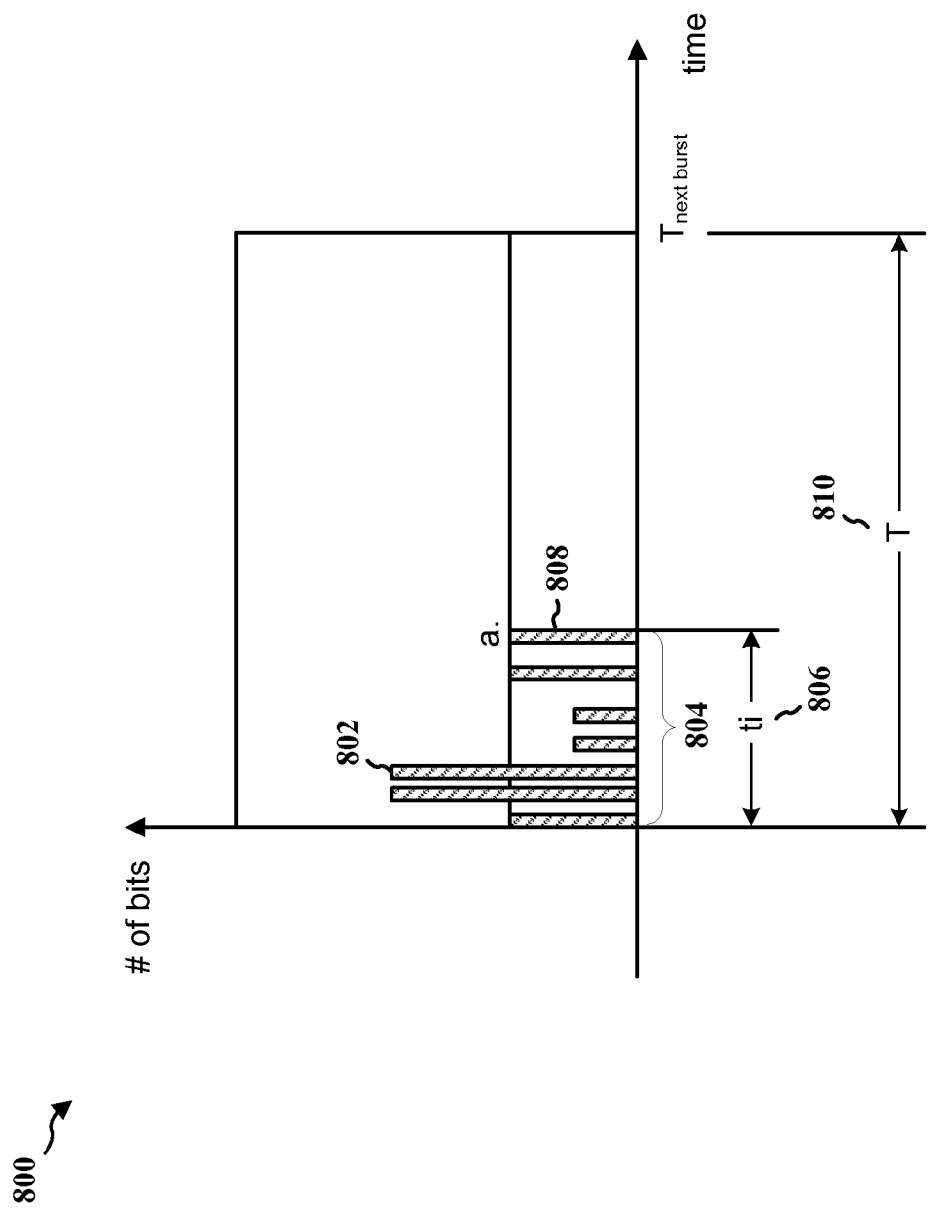
FIG. 8 is a graph illustrating a burst of uplink transmissions during a period of time t, referred to herein as burst period.

As noted above, the OBR is based on past scheduled uplink transmission grants. FIG. 8 is a graph 800 illustrating a number of scheduled uplink transmission grants 802 occurring during a period of time ti. The uplink transmission grants 802 within the time period ti are collectively referred to as a "burst" 804 of uplink transmission grants and the time period ti is referred to as a "burst period" 806. The burst period ti 806 may be part of a longer time period T (not shown), referred to as an observation period. Although only one burst period 806 is shown in FIG. 8, as explained below, an observation period T may include more than one burst period.

Continuing with reference to FIG. 8, each vertical bar within the burst period ti 806 corresponds to a particular UL transmission grant, and the height of the bar reflects the number of bits scheduled to be transmitted during the particular UL transmission grant. An UL transmission grant may start when the UE has data to transmit, e.g, when the UE indicates to the network that the UE has data to transmit, and may end when the UE buffer is empty, e.g, all data to be transmitted by the UE has been transmitted. An OBR during the burst period ti 806 is derived, for example, by summing the number of bits transmitted during each UL transmission grant 802 to arrive at a total number of bits transmitted during the burst period ti 806 and dividing the total number of bits by time ti.

In accordance with concepts disclosed herein, OBR calculations may be based on a number of burst periods ti occurring during an observation period T. In one implementation, the OBR for an observation period may be based on a moving average of the number of scheduled bits in each burst period ti. In this case, the OBR may be generally expressed as follows:

OBR=moving average of ((scheduled bits *bi* during *ti*)/(*ti*)) (Eq. 2)

Figure 9:
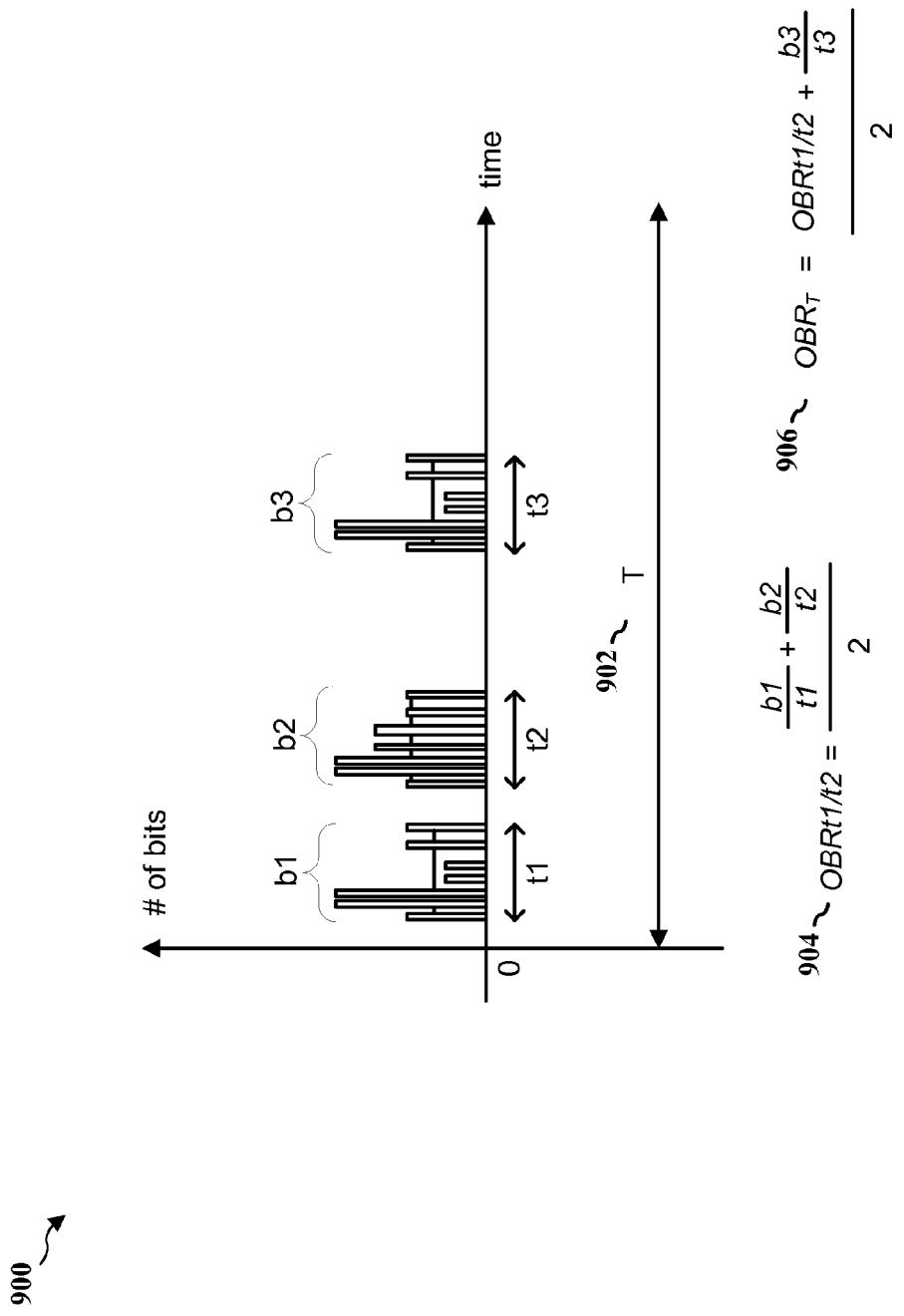
FIG. 9 is a graph illustrating an example calculation of an observed bit rate (OBR) for an observation period based on a moving average of bit rates per burst period.

FIG. 9 is a graph 900 illustrating an example calculation of an OBR for an observation period T 902 based on a moving average of bit rates per burst period. In this example, the observation period T 902 includes three burst periods t1, t2 and t3. A first average 904 is calculated based on the bit rate of a first burst period t1 and the bit rate of a second burst period t2. The bit rate for a burst period t may be calculated as the total number of bits b scheduled during the burst period, divided by the period. A second average 906 is then calculated based on the first average 904 and the bit rate of the third burst period t3. The second average 906 is the OBR for the observation period T.

In another implementation, the OBR for an observation period may be based on summations of scheduled bits and burst periods. In this case, the OBR may be generally expressed as follows:

OBR=((sum of scheduled bits *bi* during *ti*)/(sum of *ti*)) (Eq. 3)

Figure 10:
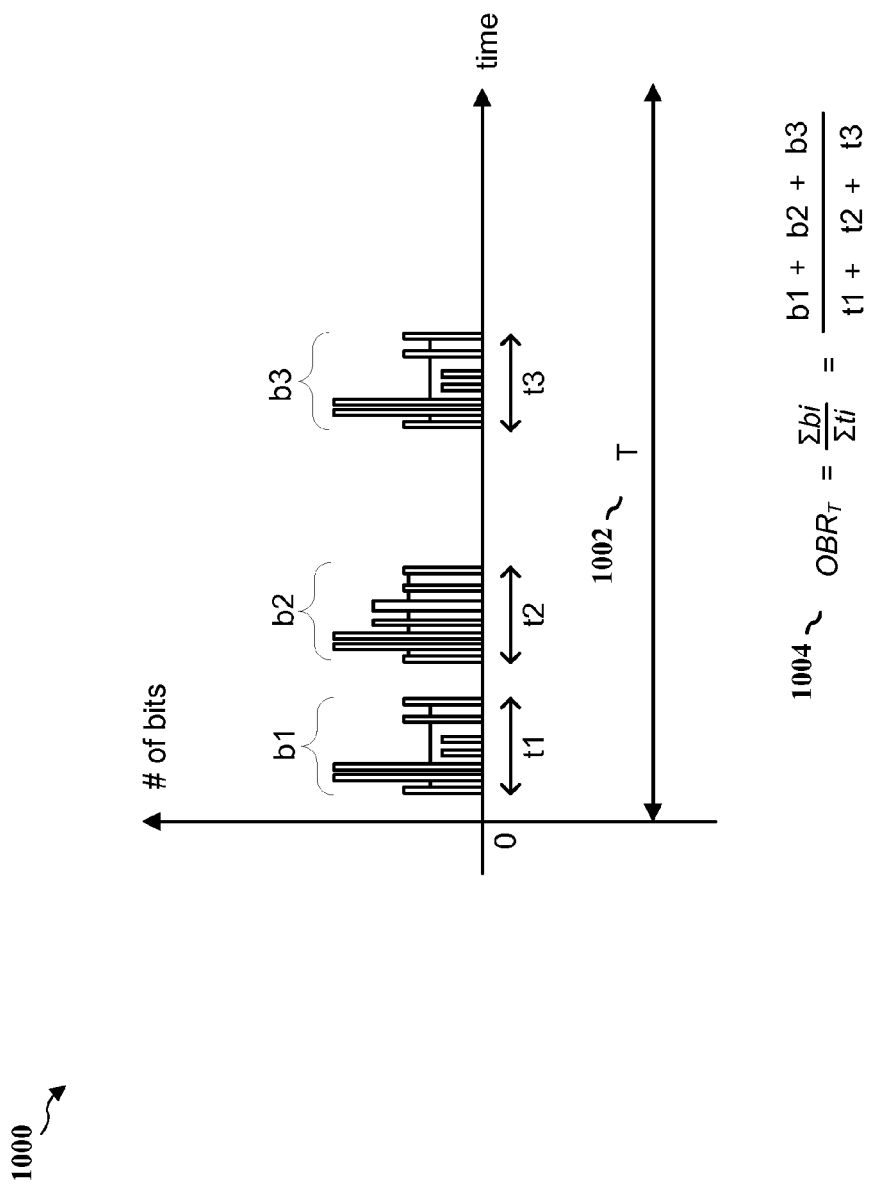
FIG. 10 is a graph illustrating an example calculation of OBR for an observation period based on a summation of scheduled bits and time periods.

FIG. 10 is a graph 1000 illustrating an example calculation of OBR for an observation period T 1002 based on a summation of scheduled bits and burst periods. In this example, the observation period T 1002 includes three burst periods t1, t2 and t3. The OBR 1004 for the observation period T 1002 may be calculated as the summation of bits scheduled during each burst period, divided by the summation of burst periods.

In another implementation, the OBR for an observation period may be based on a moving average that involves previously determined OBRs. In this case, the OBR may be generally expressed as follows:

OBR=moving average of ((sum of scheduled bits *bi* during *ti*)/(sum of *ti*)) (Eq. 4)

Figure 11:
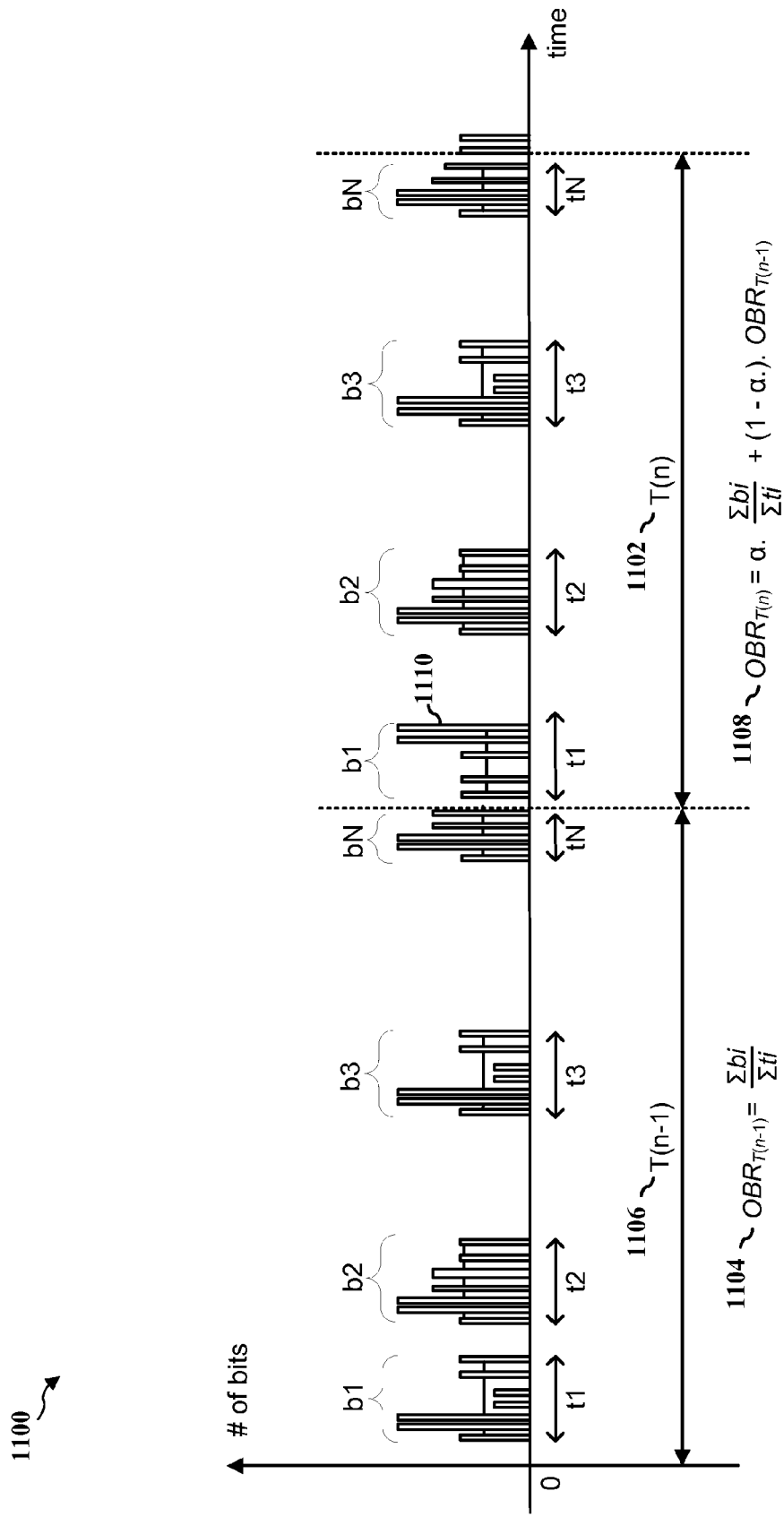
FIG. 11 is a graph illustrating a calculation of OBR for an observation period that incorporates previous calculated ORBs.

FIG. 11 is a graph 1100 illustrating a calculation of OBR 1108 for an observation period T(n) 1102 that incorporates previous calculated ORBs. A previous OBR 1104 for an observation period T(n−1) 1106 is assumed to have been calculated. During a subsequent observation period T(n) 1102 a number of complete burst periods t1 through t3 are present along with a portion tN of a burst period that carries over into the next observation period. During each burst period t1 through t3 and burst-period portion tN a number of scheduled uplink transmissions 1110 occur, as represented by the vertical bars. The number of bits in each uplink transmission 1110 is summed to arrive at a total number of bits bi transmitted during the period ti. This is repeated for each burst period t1 through t3 and burst-period portion tN in the second observation period T(n). The total number of bits b1 through b3 in burst periods t1 through t3 and the number of bits bN in burst-period portion tN are summed and divided by the total time of burst periods t1 through t3 and burst-period portion tN. In one configuration, the OBR 1108 for observation period T(n) 1102 is calculated as an exponential moving average using the following equations:

$$(\alpha \cdot OBR_n + (1+\alpha) \cdot OBR_{n-1}) \quad \text{(Eq. 5)}$$

and $$OBR_{T(n)} = \alpha \cdot \frac{\sum bi}{\sum ti} + (1-\alpha) \cdot OBR_{T(n-1)} \quad \text{(Eq. 6)}$$

where α may be any value, and in one configuration, is greater than or equal to zero and less than or equal to 1.

In one aspect, an OBR is calculated when the number of bits in the scheduled uplink transmissions exceeds a threshold corresponding to a significant amount of data. For example, the threshold number of bits may be 60 bytes. The threshold bit requirement is beneficial in that it can discount one shot transmission, such as silence indicator (SID) in LTE and transmission control protocol ACKs.

With respect to the burst periods, the start and end of a burst period may be based on communication events that may occur while the UE is in a connected mode. In one aspect, a burst period ti starts at the beginning of an uplink burst. The beginning of an uplink burst may correspond to, for example, one of: 1) transmission of a scheduling request (SR) by the UE, 2) transmission of a buffer status report (BSR) by the UE, 3) transmission of a random access channel request (RACH) by the UE, 4) the start of an "active time" timer in a UE after wake up by the UE during DXR mode, 5) the start of semi-persistent scheduling (SPS), 6) the reception of an uplink grant, 7) the presence of data in the uplink transmission buffer, or 8) the beginning of an observation period T when the UE outgoing data buffer is not empty. With respect to observation periods, these periods are repeated periodically back to back, meaning that a next observation period begins when the previous observation period expires. A first observation period in a series of back-to-back observation periods starts when the rate estimation starts, either when triggered by the upper layers or at the beginning of the RRC connection.

In one implementation, the first burst period during an observation period starts at the earliest of the foregoing communication events 1), 2), 3), 4), 5) or 6). The subsequent burst periods start at the earliest of the foregoing communication events 1), 2), 3), 4) or 5). In another implementation, the first burst period during an observation period starts at the earliest of the foregoing communication events 1), 2), 3), 6) or 7).

In another aspect, the burst periods ti may end when: 1) the UE no longer has data to transmit, such as when the UE buffer is empty, 2) the "active time" timer of the UE expires and the UE goes to sleep, 3) SPS ends, and 4) the observation period T ends. In one implementation, a burst period is considered to end at the earliest of the foregoing communication events. In another implementation, a burst period is considered to end when the UE buffer no longer has data to transmit. In most cases, a last amount of leftover data remains in the buffer to be transmitted by a UE, such that the network grants a small number of resources to the UE. This occurs often as the grant size is quantized and may not equal exactly the amount of leftover data, and in some cases the networks prefer to send a larger grant to take into account newly arrived data that was not included in the last BSR. In this case, the burst period may end upon transmission of the last transmission of data before the small transmission that empties the buffer. This removes the small number of scheduled bits from the overall estimate of uplink throughput and thus provides a more meaningful uplink throughput estimate.

In another implementation, the OBR for an observation period may be based on a moving average that involves BSRs. In this case, the OBR may be generally expressed as follows:

$$OBR = \text{moving average of ((reported } BSR \text{ total)}/(T)) \quad \text{(Eq. 7)}$$

In this case, the UE indicates to the network through a BSR the amount of data the UE has to transmit. Time T is the time it takes to transmit the data after the BSR was reported. This implementation may be used when the amount of data indicated in the BSR exceeds a threshold. For example, when more than 100 bytes arrive at the UE transmission buffers, an SR may be sent to inform the network of pending data. The eNB may send a grant to get some of the data transmitted, but also to retrieve the BSR thereby allowing for an accounting of the data to be transmitted.

Long Term Factor

The "long term factor" parameter of the estimated available total rate (Eq. 1) may be expressed as follows:

$$\text{long term factor} = \text{estimate factor}(E)*(LC/OBR) \quad \text{(Eq. 8)}$$

where:
LC=estimated link capacity;
E=estimate factor.

Link Capacity:

Regarding the link capacity (LC) parameter of the long term factor calculation, an estimate of LC may be obtained as follows:

$$\text{Link Capacity} = \text{Max(efficiency*maximum rate, sum of all } GBR) \quad \text{(Eq. 9)}$$

The efficiency parameter may be fixed or calculated. For example, efficiency may be fixed at 0.9, to take into account the impact of the typical 10% error on a transmission. Efficiency may be calculated based on retransmission acknowledgments. For example, calculated efficiency may be obtained as follows:

$$\text{Calculated efficiency} = (\text{number of ACKs})/(\text{number of uplink transmissions, including retransmissions}) \quad \text{(Eq. 10)}$$

The maximum rate corresponds to a measure of the maximum bit rate available to the UE under current radio conditions, e.g., transmission and power headroom (PHR) conditions, and assuming all possible resource blocks are allocated in a subframe. In one aspect, a measure of the maximum rate may be calculated using known techniques based on the modulation and coding scheme (MCS) of previous transmissions. The MCS gives the modulation and coding for all the radio blocks (RB). In one implementation, we assume that the UE could be granted the maximum number of RBs. In another implementation, it is assumed that the eNB continues to receive the same average grant size in terms of the past number of RBs as the recent history. Possible MCSs used in the calculation include: the last granted MCS, the MCS most granted in the recent past, and the average of maximum rates calculated using recently granted MCSs.

In another aspect, a measure of the maximum rate may be calculated as the maximum possible RBs ($M_{PUSCH\_max}$) using the following:

$$10 \log(M_{PUSCH\_max}) = P_{cMAX} - P_{O\_PUSCH}(j) - \alpha_c * PL_c - f(i) \quad \text{(Eq. 11)}$$

where $P_{cMAX}$, $P_{O\_PUSCH}(j)$, $\alpha_c$, $PL_c$ and f(i) are parameters described in 3GPP TS 36.213, version 11.4.0, section 5.1.1.1.

Estimate Factor

Figure 12:
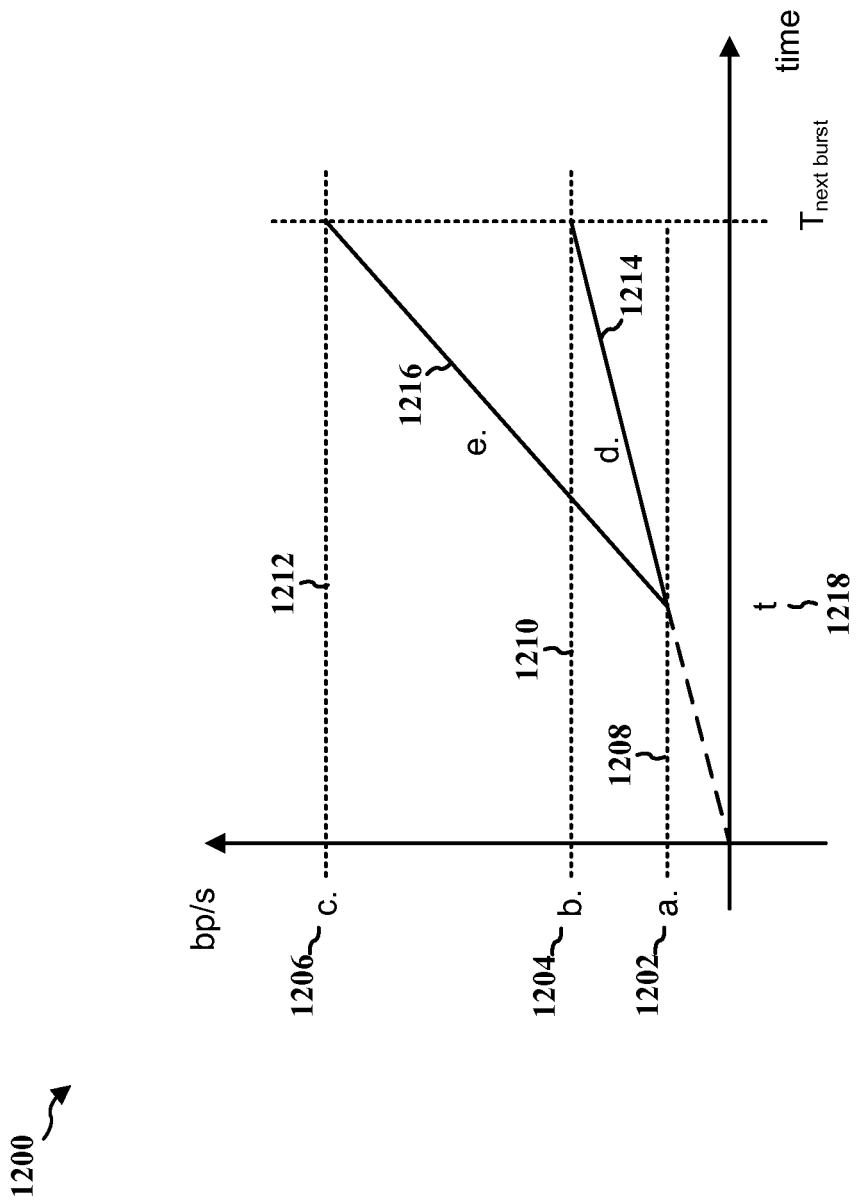
FIG. 12 is a graph illustrating bit transmission rate in bits per second (bp/s) as a function of time, including various estimated bit transmission rates for a next burst period t.

FIG. 12 is a graph 1200 illustrating bit transmission rate in bits per second (bp/s) as a function of time within an observation period T. The bit rate value "a" 1202 on the vertical axis corresponds to the observed bit rate calculated for the uplink scheduled transmission grants during the burst period ti 806 of FIG. 8. The end of the burst period ti 806 is further indicated by point "a" in FIG. 8. Returning to FIG. 12, the bit rate value "b" corresponds to a linear extrapolation of the bit rate calculated for the uplink transmissions ending at point "a" in FIG. 8, under the assumption that the network will grant uplink transmission grants having a number of bits similar to uplink grant 808, for the entire observation period T 810. The bit rate value "c" corresponds to an extrapolation of the bit rate calculated for the uplink transmission ending at point "a" in FIG. 8, under the assumption that the network will grant uplink transmission grants corresponding to an estimate of the maximum grant that the network would give the UE under the current radio conditions.

Depending on the selected estimate factor, bit rate estimations for a point in time after t 1218, may be either the bit rate "a" 1202 or bit rate "b" 1204, or a bit rate corresponding to a value that lies along line "d" 1214. In this case, the estimated bit rate may be between a value less than bit rate "a" and a value corresponding to bit rate "b". The estimated bit rate may also be the bit rate corresponding to bit rate "a" 1202 or bit rate "c" 1206, or a bit rate corresponding to a value that lies along line "e" 1216. In this case, the estimated bit rate may be between a value less than bit rate "a" and a value corresponding to bit rate "c".

The estimate factor (E) may be either statically chosen or dynamically changing. The estimate factor (E) may be statically equal to any one of the following special values Ea, Eb or Ec:

Ea=(OBR/LC)*(t/T), where T=observation period, and t=aggregate time the UE is transmitting during the observation period: When the estimate factor is Ea=(OBR/LC)*(t/T), the long term factor E*(LC/OBR) reduces to t/T, and the estimated available total rate OBR*long term factor becomes ORB*t/T. In this case, the estimated available bit rate is the transmitted bit rate "a" over all time, as shown by the horizontal line 1208 extending from "a" 1202 in FIG. 12.

Eb=(OBR/LC): When the estimate factor is Eb=(OBR/LC), the long term factor E*(LC/OBR) reduces to 1, and the estimated available total rate OBR*long term factor becomes ORB. In this case, it is assumed that the OBR "b" can be sustained over all time, as shown by the horizontal line 1210 extending from "b" 1204 in FIG. 12.

Ec=1: When the estimate factor is Ec=1, the, the long term factor E*(LC/OBR) reduces to LC/ORB, and the estimated available total rate OBR*long term factor becomes LC. In this case, it is assumed that the link capacity "c" can be sustained over all time, as shown by the horizontal line 1212 extending from "c" 1206 in FIG. 12.

Alternatively, the estimate factor (E) can be dynamically chosen to alternatively increase or decrease the estimated uplink capacity. The increase of estimated uplink capacity could be based in part on the uplink queue size, on the last burst rate, on how fast the queue is being emptied, or periodically. The decrease of estimated uplink capacity could be based in part on the uplink queue size, on the last burst rate, on how slow the queue is being emptied, or based on input from the application such as frozen frames were observed at the receiver. Furthermore, the estimate could be tied to recent past radio conditions, e.g., whether the radio conditions are getting better or worse. Dynamic estimate factors may involve scaling as follows:

E scaling in time: Ea<E<Eb: In this case, the UE probes the network for more throughput. For example, the UE may transmit a fake BSR indicating an amount of data greater than the amount of data the UE has to transmit. If the probe by the UE fails, e.g, the network does not provide more throughput, the estimate factor remains Ea, and in turn, the estimated available bit rate remains the transmitted bit rate "a" 1202 over all time, as shown by the horizontal line 1208 extending from "a" in FIG. 12. If the network does provide more throughput, the estimate factor is a value that results in an estimated available rate value between "a" 1202 and "b" 1204 as shown by the line "d" 1214 in FIG. 12.

E scaling in time and capacity: Ea<E<Ec: In this case, the UE probes the network for more throughput. If the probe by the UE fails, the estimate factor remains Ea, and in turn, the estimated available bit rate remains the transmitted bit rate "a" 1202 over all time, as shown by the horizontal line 1208 extending from "a" in FIG. 8. If the network does provide more throughput, the estimate factor is a value that results in an estimated available rate value between "a" 1202 and "c" 1206 as shown by the line "e" 1216 in FIG. 12.

Upon determining the OBR for the current observation period, estimating the available link capacity for the UE and selecting an estimate factor, the UE may estimate an available uplink throughput for future uplink transmissions by the UE as a function of the OBR, the link capacity and the estimate factor. The UE may report the estimated available uplink throughput to the application. In some cases, the UE may determine that the actual available uplink throughput is greater than the estimated available uplink throughput. The UE may indicate to the applications the possibility of a higher uplink throughput by increasing the estimated available total rate, or by setting a "Plus" flag in the interface that reports the throughput estimate to the applications.

The "Plus" flag could be set to True (+): 1) at the beginning of data call, before any data was transmitted, 2) when the past observed bit rate drops to zero, if there hasn't been any data to be transmitted recently, or 3) when the LC is much greater than the observed bit rate.

The cost of transmitting at the estimated available total rate is also reported. Cost in this regard refers to power consumed during UL transmission. In one implementation, cost is defined based on PUSCH power control parameters as:

$$C(i) = P_{O\_PUSCH,c}(j) + \alpha_c(j) \cdot PL_c + f_c(i) \quad \text{(Eq. 12)}$$

where $P_{O\_PUSCH,c}(j)$, $\alpha_c(j)$, $PL_c$ and $f_c(i)$ are parameters described in 3GPP TS 36.213, version 11.4.0, section 5.1.1.1.

If $C(i) \leq -10 \rightarrow$ Low cost
If $(C(i) > -10)$ && $(C(i) \leq 5) \rightarrow$ Medium cost
If $C(i) > 5 \rightarrow$ High cost The thresholds −10 and 5 may be configurable. C(i) is not expected to change rapidly because the pathloss (PL) is filtered and the other parameters are controlled by the eNB. A moving average of C(i) may also be used.

Figure 13:
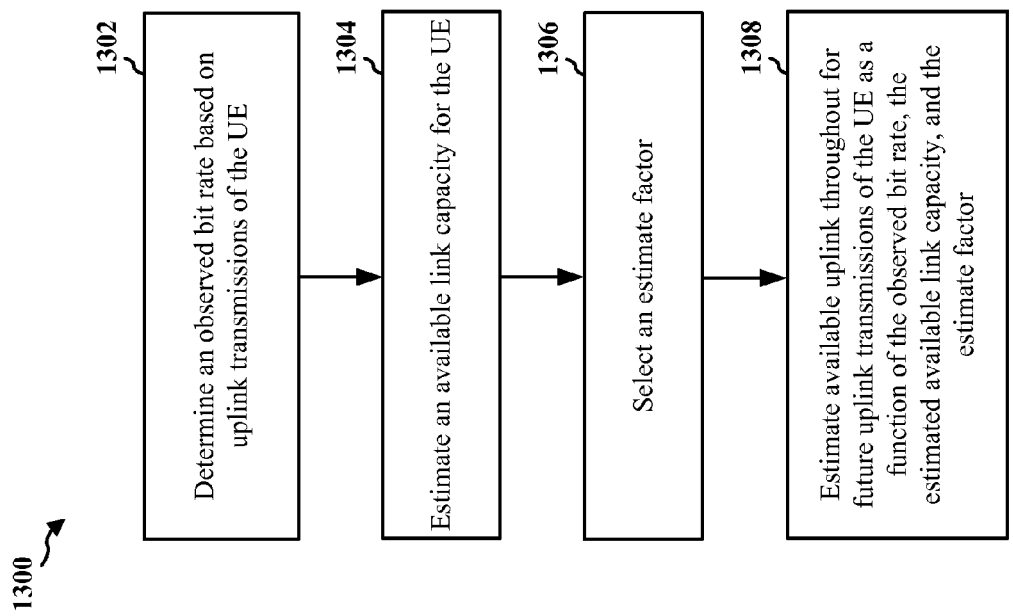
FIG. 13 is a flow chart of a method of wireless communication.

FIG. 13 is a flow chart 1300 of a method of wireless communication. The method may be performed by a UE. At 1302, the UE determines an OBR based on uplink transmissions of the UE. In one implementation, the OBR is based on scheduled uplink transmission grants and may correspond to a measure of bit rate for an observation period T including at least one burst period t having a start and an end. The start and the end may be based on communication event. For example, the communication event upon which the start of a burst period is based may correspond to the earliest of: transmission of a SR by the UE, 2) transmission of a BSR by the UE, 3) transmission of a RACH by the UE, 4) the start of an active-time timer in the UE, 5) the start of SPS, or 6) a reception of an uplink grant, or 7) a presence of data in an uplink transmit buffer of the UE. The communication event upon which the end is based may correspond to the earliest of: the UE no longer having data to transmit, 2) the active-time timer of the UE stops, 3) SPS ends, or 4) the observation period T ends. The OBR may be calculated as described above with reference to FIG. 8, FIG. 9, FIG. 10 and FIG. 11, and may be based on a moving average of individual OBRs.

In another implementation, the OBR is based on may be based on BSRs and corresponds to a measure of the total number of bits reported in the BSRs as a function of an observation period T. In this case, the UE indicates to the network through a BSR the amount of data the UE has to transmit. Time T is the time it takes to transmit the data after the BSR was reported.

At 1304, the UE estimates an available link capacity for the UE. The estimated available link capacity may be the maximum of an efficiency factor times a maximum rate, and a summation of all guaranteed bit rates. The available link capacity may be estimated based on modulation and coding schemes of previous uplink transmissions.

At 1306, the UE selects an estimate factor. In one implementation, the estimate factor may be selected such that the estimated available uplink throughput corresponds to the observed bit rate. In another implementation, the estimate factor may be selected such that the estimated available uplink throughput corresponds to the link capacity. In other implementations, an initial estimate factor may be scaled to obtain an estimated available uplink throughput at values other than the observed bit rate and the link capacity. For example, an initial estimate factor may be scaled such that the estimated available uplink throughput is between a value less than the observed bit rate and a value corresponding to a bit rate extrapolated from the observed bit rate. In another example, an initial estimate factor may be scaled such that the estimated available uplink throughput is between a value less than the observed bit rate and a value corresponding to the estimated available link capacity.

At 1308, the UE estimates available uplink throughput for future uplink transmissions of the UE as a function of the observed bit rate, the estimated available link capacity, and the estimate factor. The estimated available uplink throughput may be the maximum of the product of the observed bit rate and a long term factor, a guaranteed bit rate, and a minimum bit rate, wherein the long term factor is a function of the estimate factor.

Figure 14:
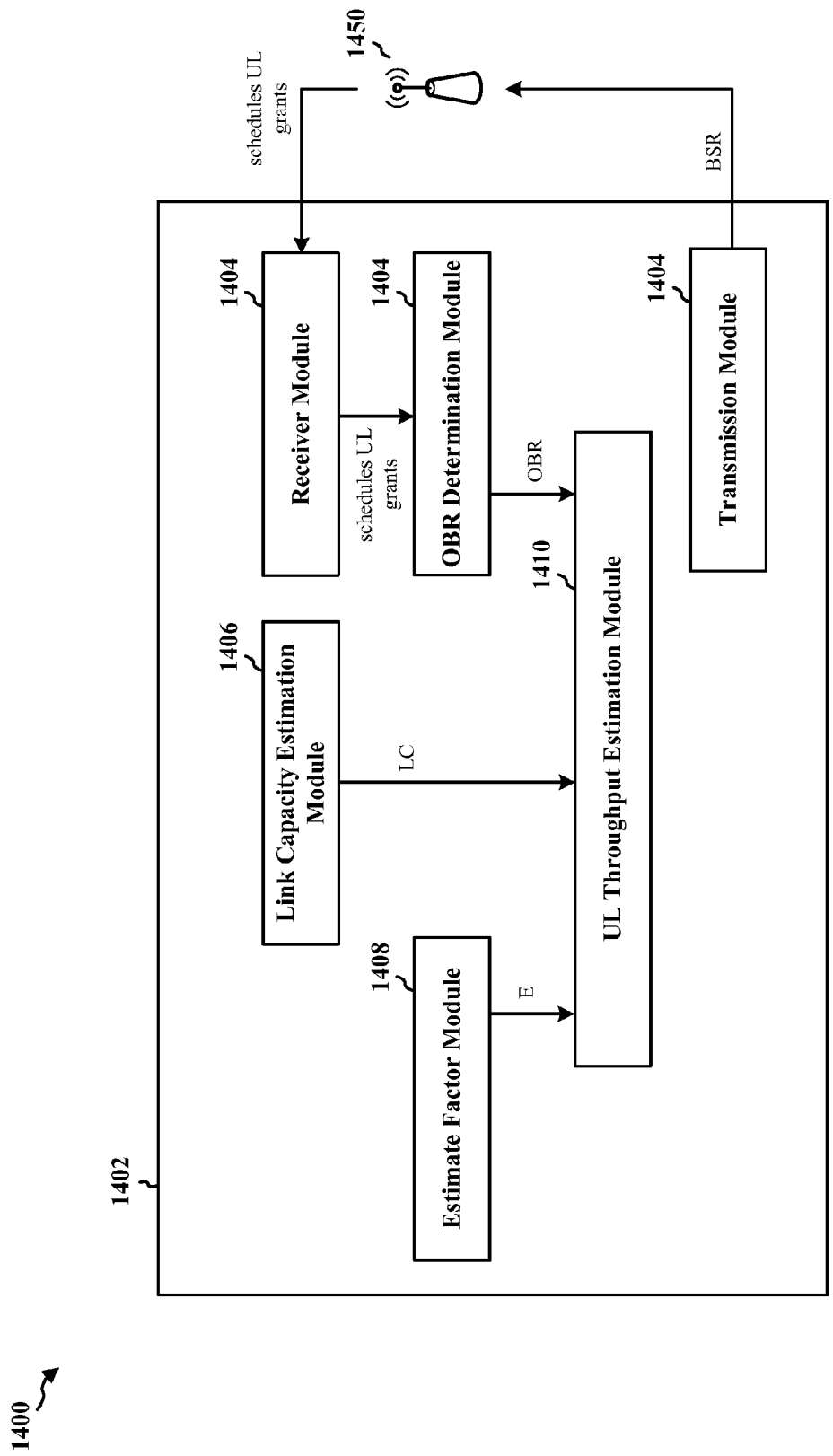
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus 1402 may be a UE. The apparatus 1402 includes an OBR determination module 1404, a link capacity estimation module 1406, an estimate factor module 1408, and a UL throughput estimation module 1410. The apparatus 1402 also includes a receiver module 1412 and a transmission module 1414.

The OBR determination module 1404 determines an observed bit rate based on uplink transmissions of the UE. To this end, the OBR determination module 1404 may process scheduled uplink grants, received from an eNB 1450 through the receiver module 1412, to determine an OBR. Alternatively, the OBR determination module 1404 may, in response to BSRs transmitted by the transmission module 1414, determine the OBR based on the time it takes for the UE to transmit the number of bits indicated in the BSR.

The link capacity estimation module 1406 estimates an available link capacity LC for the UE. The estimate factor module 1408 selects an estimate factor E. The UL throughput estimation module 1410 estimates available uplink throughput for future uplink transmissions of the UE as a function of the OBR, the estimated available LC, and the estimate factor E.

The apparatus may include additional modules that perform each of the steps of the algorithm in the aforementioned flow chart of FIG. 13. As such, each step in the aforementioned flow charts of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
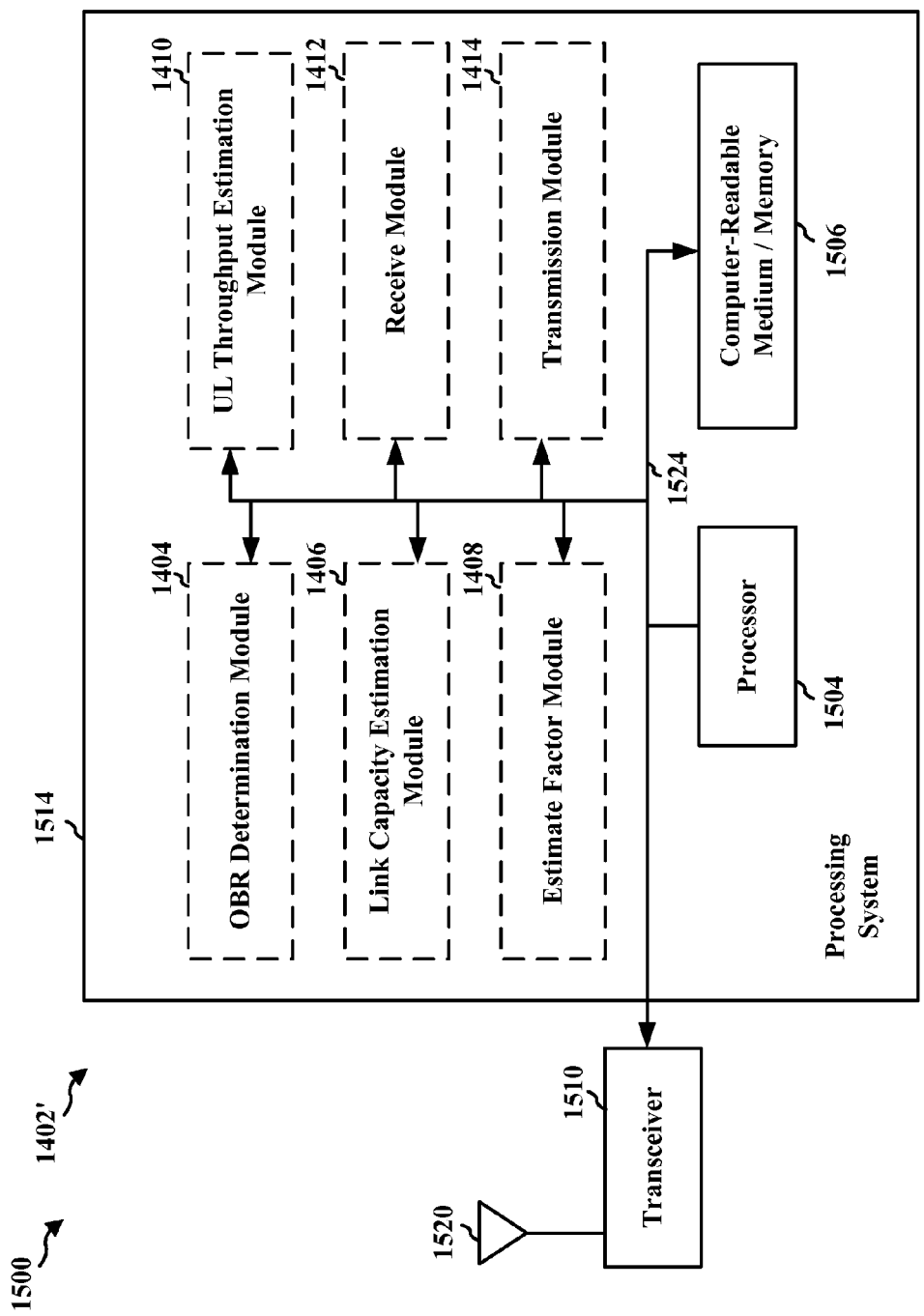
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412, 1414 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514. In addition, the transceiver 1510 receives information from the processing system 1514, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1406, 1408, 1410, 1412 and 1414. The modules may be software modules running in the processor 1504, resident/stored in the computer readable medium/memory 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.\

In one configuration, the apparatus 1402/1402' for wireless communication includes means determining an OBR based on uplink transmissions of the UE, means for estimating an available link capacity for the UE, means for selecting an estimate factor, and means for estimating available uplink throughput for future uplink transmissions of the UE as a function of the observed bit rate, the estimated available link capacity, and the estimate factor.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
   determining, by the UE, an observed bit rate based on uplink transmissions of the UE;
   estimating an available link capacity for the UE;
   selecting an estimate factor; and
   estimating an available uplink throughput for future uplink transmissions of the UE as a function of the observed bit rate, the estimated available link capacity, and the estimate factor, wherein the estimated available uplink throughput is a maximum of a product of the observed bit rate and a long term factor, a guaranteed bit rate, and a minimum bit rate, wherein the long term factor is a function of the estimate factor.

2. The method of claim 1, wherein the observed bit rate is based on scheduled uplink transmission grants and corresponds to a measure of bit rate for an observation period T including at least one burst period t having a start and an end, each of the start and the end being based on a communication event.

3. The method of claim 2, wherein the communication event upon which the start is based corresponds to an earliest of one or more of: 1) a transmission of a scheduling request (SR) by the UE, 2) a transmission of a buffer status report (BSR) by the UE, 3) a transmission of a random access channel request (RACH) by the UE, 4) a start of an active-time timer in the UE, 5) a start of semi-persistent scheduling (SPS), 6) a reception of an uplink grant, or 7) a presence of data in an uplink transmit buffer of the UE.

4. The method of claim 2, wherein the communication event upon which the end is based corresponds to an earliest of one or more of: 1) the UE not having data to transmit, 2) a stopping of an active-time timer of the UE, 3) an end of SPS, or 4) an end of the observation period T.

5. The method of claim 2, wherein the observed bit rate is an average of bit rates measured over a plurality of observation periods.

6. The method of claim 1, wherein the observed bit rate is based on BSRs and corresponds to a measure of a total number of bits reported in the BSRs as a function of a total time taken to transmit the total number of bits.

7. The method of claim 1, wherein the estimated available link capacity is a maximum of an efficiency factor times a maximum rate, and a summation of all guaranteed bit rates.

8. The method of claim 7, wherein the maximum rate is based on modulation and coding schemes of previous uplink transmissions.

9. The method of claim 1, wherein the estimate factor is selected such that the estimated available uplink throughput corresponds to the observed bit rate.

10. The method of claim 1, wherein the estimate factor is selected such that the estimated available uplink throughput corresponds to the estimated available link capacity.

11. The method of claim 1, wherein selecting an estimate factor comprises scaling an initial estimate factor such that the estimated available uplink throughput is between a value less than the observed bit rate and a value corresponding to a bit rate extrapolated from the observed bit rate.

12. The method of claim 1, wherein selecting an estimate factor comprises scaling an initial estimate factor such that the estimated available uplink throughput is between a value less than the observed bit rate and a value corresponding to the estimated available link capacity.

13. An apparatus for wireless communication, the apparatus being a user equipment (UE), comprising:
 means for determining an observed bit rate based on uplink transmissions of the UE;
 means for estimating an available link capacity for the UE;
 means for selecting an estimate factor; and
 means for estimating an available uplink throughput for future uplink transmissions of the UE as a function of the observed bit rate, the estimated available link capacity, and the estimate factor, wherein the estimated available uplink throughput is a maximum of a product of the observed bit rate and a long term factor, a guaranteed bit rate, and a minimum bit rate, wherein the long term factor is a function of the estimate factor.

14. The apparatus of claim 13, wherein the observed bit rate is based on scheduled uplink transmission grants and corresponds to a measure of bit rate for an observation period T including at least one burst period t having a start and an end, each of the start and the end being based on a communication event.

15. The apparatus of claim 14, wherein the communication event upon which the start is based corresponds to an earliest of one or more of: 1) a transmission of a scheduling request (SR) by the UE, 2) a transmission of a buffer status report (BSR) by the UE, 3) a transmission of a random access channel request (RACH) by the UE, 4) a start of an active-time timer in the UE, 5) a start of semi-persistent scheduling (SPS), 6) a reception of an uplink grant, or 7) a presence of data in an uplink transmit buffer of the UE.

16. The apparatus of claim 14, wherein the communication event upon which the end is based corresponds to an earliest of one or more of: 1) the UE not having data to transmit, 2) a stopping of an active-time timer of the UE, 3) an end of SPS, or 4) an end of the observation period T.

17. The apparatus of claim 14, wherein the observed bit rate is an average of bit rates measured over a plurality of observation periods.

18. The apparatus of claim 13, wherein the observed bit rate is based on BSRs and corresponds to a measure of a total number of bits reported in the BSRs as a function of a total time taken to transmit the total number of bits.

19. The apparatus of claim 13, wherein the estimated available link capacity is a maximum of an efficiency factor times a maximum rate, and a summation of all guaranteed bit rates.

20. The apparatus of claim 19, wherein the maximum rate is based on modulation and coding schemes of previous uplink transmissions.

21. The apparatus of claim 13, wherein the estimate factor is selected such that the estimated available uplink throughput corresponds to the observed bit rate.

22. The apparatus of claim 13, wherein the estimate factor is selected such that the estimated available uplink throughput corresponds to the estimated available link capacity.

23. The apparatus of claim 13, wherein the means for selecting an estimate factor is configured to scale an initial estimate factor such that the estimated available uplink throughput is between a value less than the observed bit rate and a value corresponding to a bit rate extrapolated from the observed bit rate.

24. The apparatus of claim 13, wherein the means for selecting an estimate factor is configured to scale an initial estimate factor such that the estimated available uplink throughput is between a value less than the observed bit rate and a value corresponding to the estimated available link capacity.

25. An apparatus for wireless communication, the apparatus being a user equipment (UE), comprising:
 a memory; and
 at least one processor coupled to the memory and configured to:
  determine an observed bit rate based on uplink transmissions of the UE;
  estimate an available link capacity for the UE;
  select an estimate factor; and
  estimate an available uplink throughput for future uplink transmissions of the UE as a function of the observed bit rate, the estimated available link capacity, and the estimate factor, wherein the estimated available uplink throughput is a maximum of a product of the observed bit rate and a long term factor, a guaranteed bit rate, and a minimum bit rate, wherein the long term factor is a function of the estimate factor.

26. A non-transitory computer-readable medium storing computer executable code, comprising code to:
 determine an observed bit rate based on uplink transmissions of a user equipment (UE);
 estimate an available link capacity for the UE;
 select an estimate factor; and
 estimate an available uplink throughput for future uplink transmissions of the UE as a function of the observed bit rate, the estimated available link capacity, and the estimate factor, wherein the estimated available uplink throughput is a maximum of a product of the observed bit rate and a long term factor, a guaranteed bit rate, and a minimum bit rate, wherein the long term factor is a function of the estimate factor.

* * * * *